United States Patent [19]
Suzuki et al.

[11] Patent Number: 5,852,537
[45] Date of Patent: Dec. 22, 1998

[54] MAGNETIC RECORDING AND REPRODUCTION APPARATUS

[75] Inventors: Hiroyuki Suzuki, Kitakatsuragi-gun; Ichiro Senda, Toyonaka, both of Japan

[73] Assignee: Matsushita Electric Industrial Co., Ltd., Japan

[21] Appl. No.: 933,515

[22] Filed: Sep. 18, 1997

[30] Foreign Application Priority Data

Sep. 30, 1996 [JP] Japan ................................ 8-257921

[51] Int. Cl.⁶ .......................... G11B 15/46; G11B 15/18
[52] U.S. Cl. ................................ 360/137; 360/85; 360/95
[58] Field of Search ................................ 360/84, 85, 93, 360/95, 96.5, 137; 341/16

[56] References Cited

U.S. PATENT DOCUMENTS

| | | | |
|---|---|---|---|
| 4,652,947 | 3/1987 | Oka et al. | 360/85 |
| 4,945,195 | 7/1990 | Ipcinski | 200/6 B |
| 5,061,848 | 10/1991 | Choi | 250/229 |
| 5,653,396 | 8/1997 | Lee | 242/334.4 |

FOREIGN PATENT DOCUMENTS

| | | |
|---|---|---|
| 58-147845 | 9/1983 | Japan . |
| 8-065561 | 3/1996 | Japan . |

*Primary Examiner*—William J. Klimowicz
*Attorney, Agent, or Firm*—Parkhurst & Wendel, L.L.P

[57] ABSTRACT

A rotating shaft section of a rotation cam gear supported on the chassis side and transmitting the driving force of a driving motor can be inserted into and removed from a rotating shaft section of a mode detection switch for detecting a mode from the rotating position of the rotating cam gear. A protruding pointed portion and a groove that are fitted to each other to transmit the rotational force of the rotating cam gear are formed in these rotating shaft sections. Output terminals of the mode detection switch are coupled and attached to the circuit section of a circuit substrate, and the rotating shaft section of the mode detection switch is inserted into the rotating shaft section of the rotating cam gear supported on the chassis side to engage the protruding portion with the groove. This constitution enables easy and smooth insertion and fitting of the rotating shaft sections, thereby improving working efficiency.

4 Claims, 7 Drawing Sheets

MAGNETIC RECORDING AND REPRODUCTION APPARATUS

FIELD OF THE INVENTION

The present invention relates to a magnetic recording and reproduction apparatus such as a video tape recorder.

BACKGROUND OF THE INVENTION

To allow a tape cassette, a tape withdraw post, or a capstan pinch roller to be moved appropriately in conjunction with multiple modes (cassette eject, cassette lowering, intermediate, replay, counter replay, rapid traverse and rewind modes), conventional magnetic recording and reproduction apparatuses such as video tape recorders use a structure that uses a single motor to rotate a main cam gear while simultaneously driving each of the above parts (parts for moving a tape cassette, parts for moving the tape withdraw post, and parts for moving the capstan pinch roller) via an engagement and transmission part engaged with the main cam gear.

Such magnetic recording and reproduction apparatuses detect the position of the main cam gear using a mode detection switch comprising a rotary encoder capable of detecting absolute values, and control the driving motor based on the detected position by the mode detection switch.

In a conventional mounting structure for the mode detection switch, a mode detection switch 1 is mounted on a chassis 3 via a screw 2 as shown in FIGS. 5 and 6. Besides the mode detection switch 1, the chassis 3 includes a loading motor 4, a worm wheel gear 5 with its first gear section 5a engaged with a worm gear 4a of the loading motor 4, a main cam gear 6 with its first gear section 6a engaged with a second gear section 5b of the worm wheel gear 5, and a subcam gear 7 with its first gear section 7a engaged with a second gear section 6b of the main cam gear 6. A gear section 1a of the mode detection switch 1 is engaged with a second gear section 7b of the subcam gear 7.

In the mode detection switch 1, as shown in FIG. 7A, a brush 1c coupled to a rotating shaft 1b of the gear section 1a is rotated while slidably contacting a conductive pattern 1d, and a plurality of output terminals 1e for outputting electric signals are provided. In addition, to output signals from the output terminals 1e toward a circuit substrate 8, a connector 9 is connected and attached to the circuit substrate 8 beforehand. As the output terminals 1e of the mode detection switch 1 contact the connector 9, they are electrically connected thereto.

Due to the need for the connector 9 that connects the mode detection switch 1 to the circuit substrate 8, however, the conventional mounting structure for the mode detection switch requires a larger number of parts, thereby increasing manufacturing costs.

It is also contemplated that the output terminals 1e of the mode detection switch 1 are connected to the circuit substrate 8 with wiring cords without the use of the connector 9, but this configuration requires time and labor in wiring processing, thereby increasing working time to increase manufacturing costs.

DISCLOSURE OF THE INVENTION

It is thus an object of this invention to provide a magnetic recording and reproduction apparatus that can solve the above problems and reduce manufacturing costs.

To solve the above problems, a magnetic recording and reproduction apparatus of this invention comprises: a rotating shaft section of a rotating cam gear supported on a side of a chassis side and transmitting the driving force of a driving motor and a rotating shaft section of a mode detection switch for detecting a mode from a rotating position of the rotating cam gear, which rotating shaft sections can be inserted into and removed from each other; a recessed portion and a protruding portion formed in the rotating shaft sections to be engaged with each other to transmit the rotational force of the rotating cam gear; and output terminals of the mode detection switch coupled and attached to the circuit section of the circuit substrate; whereby, the rotating shaft section of the mode detection switch is inserted into the rotating shaft section of the rotating cam gear supported on the chassis side to engage the recessed portion with the protruding portion.

This configuration allows the rotation of the rotating shaft section of the rotating cam gear to be appropriately transmitted to the rotating shaft section of the mode detection switch via the recessed portion and the protruding portion of both the rotating shaft sections. In addition, since the output terminals of the mode detection switch can be directly connected to the rotating section of the circuit substrate, the need for connectors and wiring processing can be eliminated, thereby reducing manufacturing costs.

According to this invention, in the magnetic recording and reproduction apparatus, at least one of the recessed and protruding portions has an inclined or bent surface which guides itself to be fitted into the corresponding protruding or recessed portion of the other rotating shaft section.

Even if the relative positions of the recessed and protruding portions of the rotating shaft sections are slightly offset when the rotating shaft sections are inserted into each other, the inclined or bent surface guides the recessed and protruding portions to be fitted into each other therebetween. Thus, the rotating shaft sections can be inserted and fitted into each other easily and smoothly, thereby improving working efficiency.

According to this invention, the magnetic recording and reproduction apparatus includes a protrusion or a dent for positioning formed in a rotating-shaft-section-side cover material which rotates integrally with the rotating shaft section of the mode detection switch, and a dent or a protrusion formed in a part of a base fixed to the circuit substrate, said part being opposed to the rotating-shaft-section-side cover material, said dent or the protrusion being engaged with the corresponding protruding portion or the dent in the rotating-shaft-section-side cover material.

This configuration enables the protrusion or dent in the rotating-shaft-section-side cover material to be engaged with the dent or protrusion in the base prior to the insertion and fitting of the rotating shaft sections, thereby preventing the rotating shaft section of the mode detection switch from being rotated to affect the insertion and fitting.

According to this invention, in the magnetic recording and reproduction apparatus, the mode detection switch includes claws engaged with the circuit substrate to support the mode detection switch and a protrusion engaged with the circuit substrate to position the mode detection switch.

According to this configuration, by engaging the claws and protrusion of the mode detection switch with the circuit substrate before coupling the output terminals of the mode detection switch to the circuit section of the circuit substrate, the output terminals of the mode detection switch can be coupled to the circuit section of the circuit substrate while being positioned and supported at a regular position on the circuit substrate, thus enabling efficient coupling operation.

In addition, with the protrusion for positioning the mode detection switch, positioning can be carried out accurately. In addition, since the mode detection switch is engaged with the circuit substrate using the claws, even if an external force is applied to the mode detection switch, the force can be received by the claws, whereby the output terminals of the mode detection switch can be prevented from being deformed or disconnected in the coupled section by the force.

DESCRIPTION OF THE PREFERRED EMBODIMENT

The embodiment of this invention is described with reference to FIGS. 1 to 4.

Figure 1:
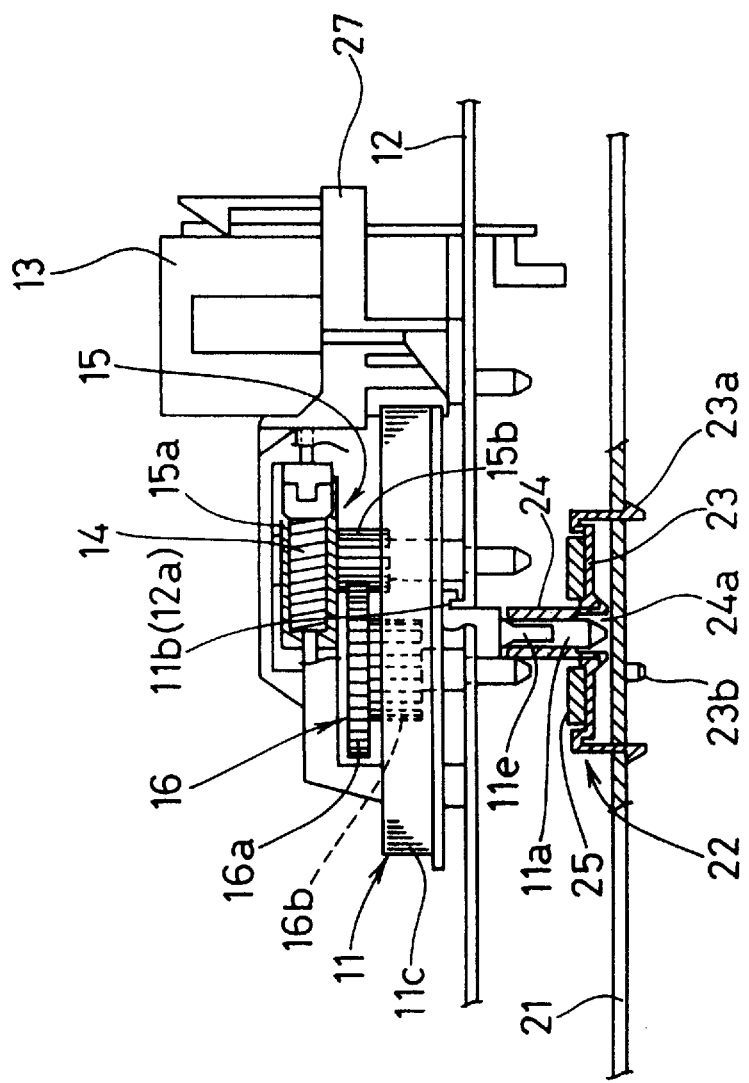
FIG. 1 is a plan view of the area of a rotating cam gear in a magnetic recording and reproduction apparatus according to an embodiment of this invention.
Figure 2:
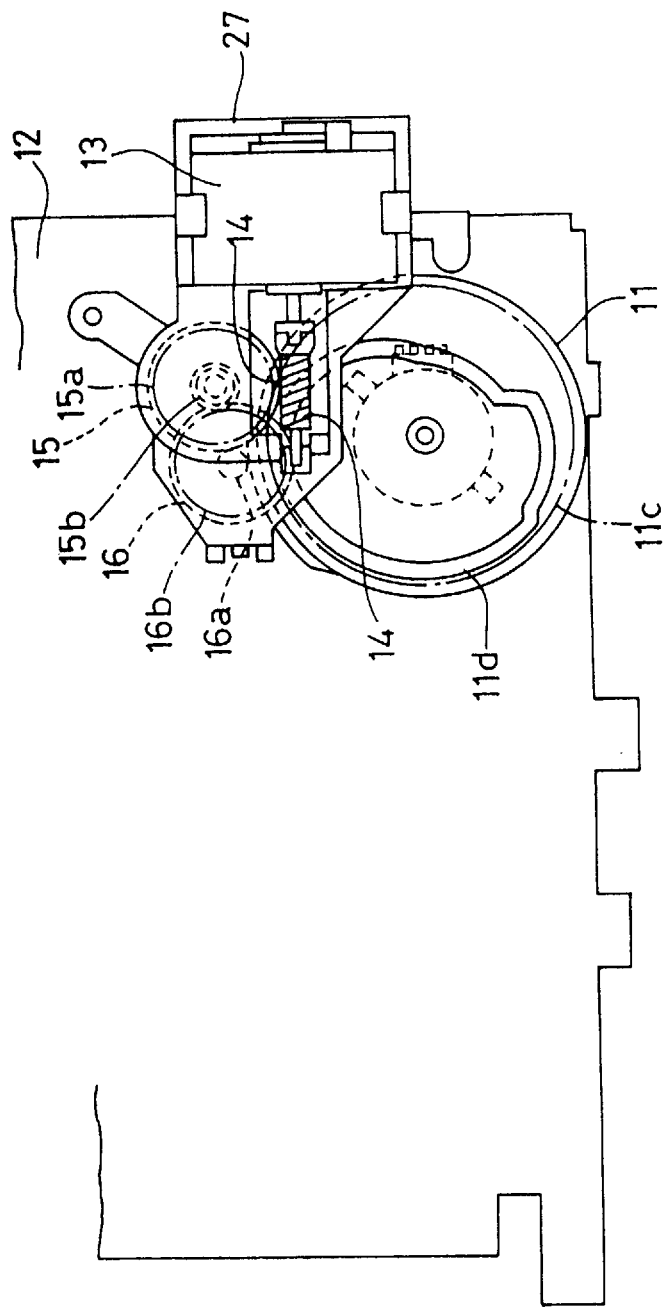
FIG. 2 is a partially cutout front view of the area of the rotating cam gear and a mode detection switch in the magnetic recording and reproduction apparatus shown in FIG. 1.

In FIGS. 1 and 2, reference numeral 11 designates a rotating cam gear in which a large-diameter groove section 11b is formed in the base of a protruding shaft section 11a that protrudes downward. The rotating cam gear 11 is rotatably supported with its large-diameter groove section 11b fitted in a cylindrical portion 12a formed on a chassis 12. A mounting bracket 27 is engagingly locked to the chassis 12 and includes a loading motor 13 as a driving motor.

A pinion 14 is coupled to the driving shaft of the loading motor 13 so that the rotation of the pinion 14 can be transmitted to the rotating cam gear 11 via a first speed reducing gear 15 and a second speed reducing gear 16. That is, the first and the second speed reducing gears, 15 and 16, are rotatably supported in such a way that their rotating shafts are fitted in two holes formed in the chassis 12 and holes formed in the mounting bracket 27. A large-diameter gear section 15a of the first speed reducing gear 15 is engaged with the pinion 14, a small-diameter gear section 15b of the first speed reducing gear 15 is engaged with a large-diameter gear section 16a of the second speed reducing gear 16, and a large-diameter gear section 16b of the second speed reducing gear 16 is engaged with outer circumferential teeth 11c of the rotating cam gear 11. Thus, the rotation of the loading motor 13 is transmitted to the rotating cam gear 11 while its speed is simultaneously being reduced, thereby causing the rotating cam gear 11 to be rotated.

A cam groove 11d is formed in the top and bottom surfaces of the rotating cam gear 11 (only the top surface is shown), and moving mechanisms of a tape cassette, a tape withdraw post, and a capstan pinch roller are driven via a lever the one end of which is engaged with the cam groove 11d in the top surface or an engagement part engaged with the cam groove in the bottom surface.

Figure 3:
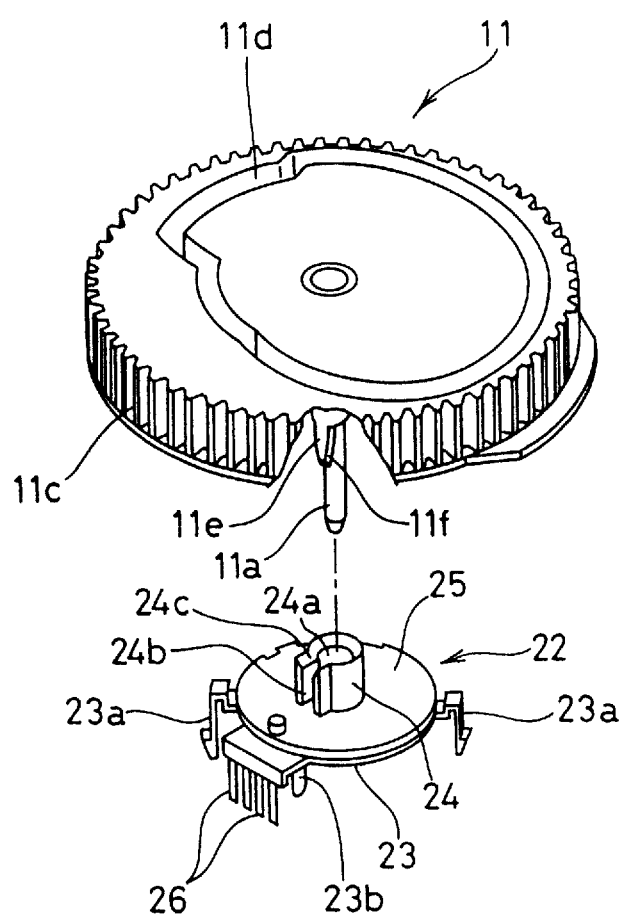
FIG. 3 is a perspective view of the area of the rotating cam gear and mode detection switch in the magnetic recording and reproduction apparatus shown in FIG. 1.

As shown in FIGS. 1 and 3, the rotating shaft section 11a of the rotating cam gear 11 penetrates the chassis 12 to protrude downward and is formed to be tapered from its approximate middle toward its tip. A protruding pointed portion 11e is formed in the middle of the rotating shaft section 11a of the rotating cam gear 11 as a protruding portion, and a tapered surface 11f (see FIG. 3) the width of which becomes smaller as it approaches its tip is formed at the tip of the protruding pointed portion 11e.

As shown in FIG. 1, a circuit substrate 21 is disposed below the chassis 12 with a specified gap provided between them, and a mode detection switch 22 for detecting a mode from the rotating position of the rotating cam gear 11 is mounted on the circuit substrate 21 directly below the rotating cam gear 11.

Figure 4:
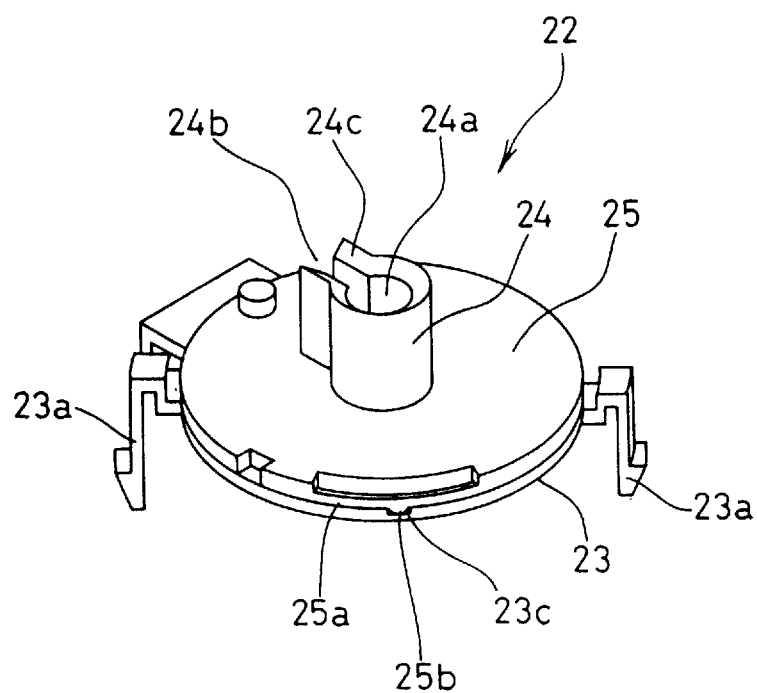
FIG. 4 is a perspective view of the mode detection switch in the magnetic recording and reproduction apparatus shown in FIG. 1.
Figure 5:
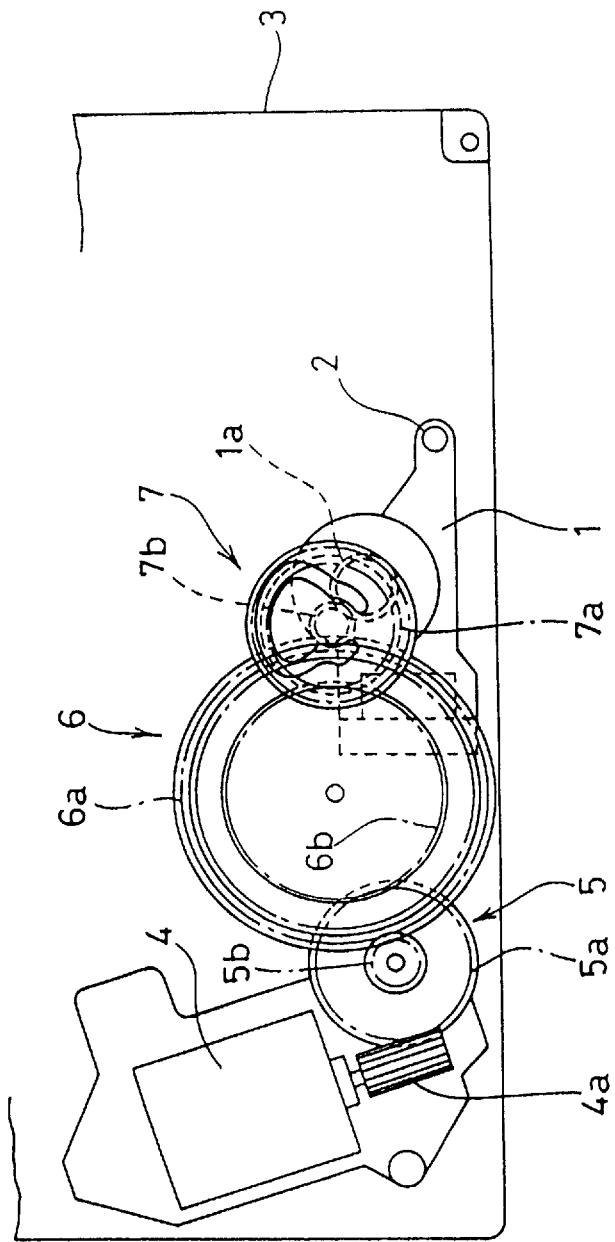
FIG. 5 is a plan view of the area of a rotating cam gear in a conventional magnetic recording and reproduction apparatus.
Figure 6:
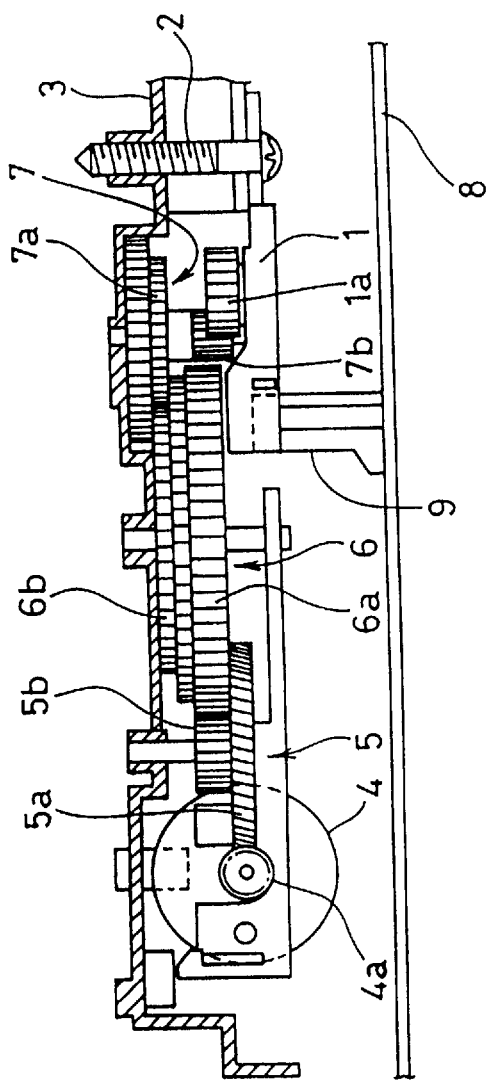
FIG. 6 is a partially cutout front view of the area of the rotating cam gear and a mode detection switch in the conventional magnetic recording and reproduction apparatus shown in FIG. 5.
Figure 7B:
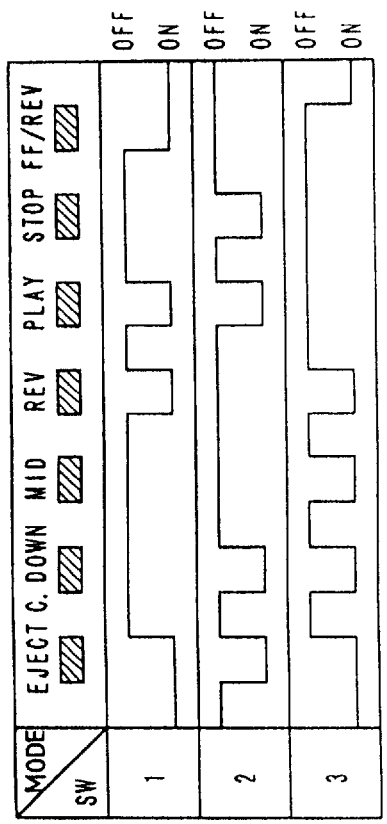
FIG. 7B shows the relationship between the switch output and mode switching of the mode detection switch in the conventional magnetic recording and reproduction apparatus shown in FIG. 5.
Figure 7A:
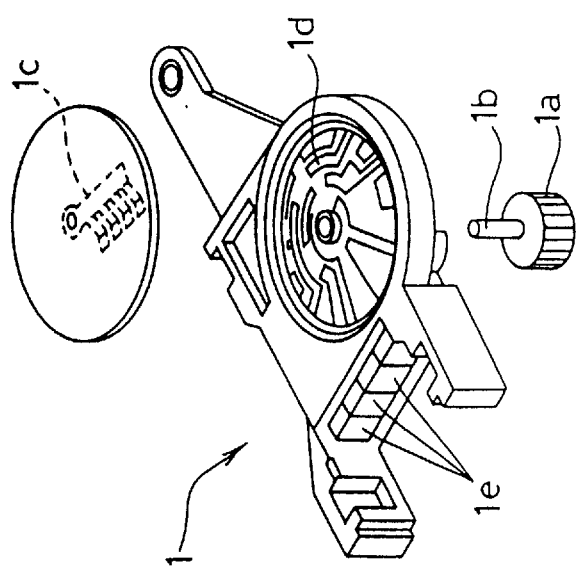
FIG. 7A is an exploded perspective view of the mode detection switch in the conventional magnetic recording and reproduction apparatus shown in FIG. 5.

As shown in FIGS. 3 and 4, the mode detection switch 22 comprises a base 23 with a conductive pattern (not shown) formed on its top surface, a rotating shaft section 24 with its lower part engaged with a hole formed in the middle of the base 23 so as to be rotatably supported, a rotating-shaft-side cover material 25 integrated with the rotating shaft section 24 and having on its rear surface a conductive brush (not shown) that contacts the conductive pattern, and a plurality of output terminals 26 protruding downward from the base 23.

In addition, the base 23 includes a pair of claws 23a engaged with the circuit substrate 21 to support the mode detection switch 22, and a protrusion 23b engaged with the circuit substrate 21 to position the mode detection switch 22, wherein the output terminals 26 soldered and coupled to the circuit section of the circuit substrate 21 with the claws 23a and protrusion 23b of the mode detection switch 22 fitted in the holes in the circuit substrate 21 for positioning and supported.

The rotating shaft section 24 of the mode detection switch 22 is cylindrical and has an insertion hole 24a formed therethrough, into which the small-diameter portion of the rotating shaft section 11a of the rotating cam gear 11 can be inserted. In addition, a groove 24b extending from the tip of the rotating shaft section 24 along its axial direction is formed in the rotating shaft section 24 as a recessed portion so that the protruding pointed portion 11e of the rotating shaft section 11a of the rotating cam gear 11 can be fitted in the groove 24b when the small-diameter portion of the rotating shaft section 11a of the rotating cam gear 11 is inserted into the rotating shaft section 24 of the mode detection switch 22. A tapered surface 24c is also formed on the inner circumference of the tip of the rotating shaft section 24 including its portion in which the groove 24b is opened. The tapered surface 24c guides the fitting of the rotating shaft section 11a and protruding pointed portion 11e of the rotating cam gear 11.

The rotating shaft section 11a of the rotating cam gear 11 supported by the chassis 12 is inserted into the rotating shaft section 24 of the mode detection switch 22 fixed to the circuit substrate 21, and the protruding pointed portion lie of the rotating cam gear 11 is fitted in the groove 24b of the rotating shaft section 24 of the mode detection switch 22. This configuration allows the rotation of the rotating cam gear 11 to be transmitted to the mode detection switch 22.

In addition, a thinner portion 25a is formed in some of the parts toward the bottom surface of the outer circumference in the rotating-shaft-section-side cover material 25 of the mode detection switch 22 and a protrusion 25b for positioning the rotating shaft section 24 is formed on the bottom surface of the thinner portion 25a, as shown in FIG. 4. A dent 23c with which the protrusion 25b of the rotating-shaft-side cover material 25 can be engaged is formed in the top surface of the outer circumference of the base 23.

Next, a procedure for assembling the mode detection switch 22 with the apparatus so that it can be operated is described.

The rotating cam gear 11 is loaded on the chassis 12 in such a way that the rotating shaft section 11a of the rotating cam gear 11 protrudes from the cylindrical portion 12a of the chassis 12. The loading motor 13, the pinion 14, the first speed reducing gear 15, and the second speed reducing gear 16 are assembled to the chassis 12 so that the rotating cam gear 11 can be supported by the chassis 12.

The claws 23a and protrusion 23b of the mode detection switch 22 are engaged with the holes in the circuit substrate 21 so that the mode detection switch 22 can be supported by the circuit substrate 21. The output terminals 26 of the mode detection switch 22 are then soldered and coupled to the circuit section of the circuit substrate 21. This operation enables the mode detection switch 22 to be connected and fixed to the circuit substrate 21 without the use of connectors or wiring cords.

Subsequently, the circuit substrate 21 with the mode detection switch 22 mounted thereon is assembled to the chassis 12, and the rotating shaft section 11a of the rotating cam gear 11 is inserted into the rotating shaft section 24 of the mode detection switch 22. At this point, by rotating the rotating shaft section 24 of the mode detection switch 22 so that the protrusion 25b of the rotating-shaft-section-side cover material 25 is engaged with the dent 23c of the base 23, the rotating position of the rotating shaft section 24 can be positioned easily and simply prevented from being changed. The rotating cam gear 11 is also disposed at a specified rotating position. When the rotating shaft sections 11a and 24 are inserted into each other, the rotating shaft section 11a of the rotating cam gear 11 can be inserted into the rotating shaft section 24 of the mode detection switch 22 easily because the rotating shaft section 11a of the rotating cam gear 11 is tapered and because the tapered surface 24c is formed on the inner circumference of the tip of the rotating shaft section 24 of the mode detection switch 22. In addition, since the tapered surface 11f is formed on the protruding pointed portion 11e on the rotating shaft section 11a of the rotating cam gear 11 and the tapered surface 24c is formed on the groove 24b in the rotating shaft section 24 of the mode detection switch 22, these tapered surfaces 11f and 24c guide the fitting of the protruding pointed portion 11e in the groove 24b to allow the portion 11e to be appropriately fitted in the groove 24b even if the rotating position of the rotating shaft section 1a of the rotating cam gear 11 is a little different from that of the rotating shaft section 24 of the made detection switch 22.

In this manner, simple operation enables the mode detection switch 22 to be efficiently assembled with the apparatus. In addition, the rotation of the rotating cam gear 11 is transmitted to the mode detection switch 22, thereby enabling the rotating position of the rotating cam gear 11 to be accurately detected by the mode detection switch 22.

Although the protrusion 25b of the rotating-shaft-section-side cover material 25 of the mode detection switch 22 is engaged with the dent 23c in the base 23 to position the rotating shaft section 24 of the mode detection switch 22, a small amount of force enables the protrusion 25b of the rotating-shaft-section-side cover material 25 to be removed from the dent 23c in the base 23 without disturbing the rotating operation because the protrusion 25b is simply elastically held by the thinner portion 25a.

In addition, although this embodiment has been described in conjunction with the insertion of the rotating shaft section 11a of the rotating cam gear 11 into the rotating shaft section 24 of the mode detection switch 22, the rotating shaft section 24 of the mode detection switch 22 may be inserted into the rotating shaft section 11a of the rotating cam gear 11. In addition, although this embodiment has been described in conjunction with the groove 24b and the protruding pointed portion 11e as the recessed and the protruding portions formed in the rotating shaft sections 11a and 24, this invention is not limited to this aspect but similar effects can be obtained by inverting the recess and protrusion relationship between the rotating shaft sections 11a and 24. Furthermore, instead of the inclined surface, a bent surface may be formed as a guide surface for guiding the fitting of the protruding portion of the rotating shaft section 11a or 24 in the recessed portion of the rotating shaft section 24 or 11a.

We claim:

1. A magnetic recording and reproduction apparatus comprising:

a rotating shaft section of a rotating cam gear supported on a side of a chassis and transmitting the driving force of a driving motor and a rotating shaft section of a mode detection switch for detecting a mode from a rotating position of the rotating cam gear, which rotating shaft sections can be inserted into and removed from each other;

a recessed portion and a protruding portion formed in the rotating shaft sections to be engaged with each other to transmit the rotational force of the rotating cam gear; and output terminals of the mode detection switch coupled and attached to a circuit section of a circuit substrate;

whereby, the rotating shaft section of the mode detection switch is inserted into the rotating shaft section of the rotating cam gear supported on the chassis side to engage the recessed portion with the protruding portion.

2. A magnetic recording and reproduction apparatus according to claim 1, wherein at least one of the recessed and protruding portions has an inclined or bent surface which guides itself to be fitted into the corresponding protruding or recessed portion of the other rotating shaft section.

3. A magnetic recording and reproduction apparatus according to claim 1, further comprising a protrusion or a dent for positioning formed in a rotating-shaft-section-side cover material which rotates integrally with the rotating shaft section of the mode detection switch, and a dent or a protrusion formed in a part of a base fixed to the circuit substrate, said part being opposed to the rotating-shaftsection-side cover material, said dent or protrusion being engaged with the corresponding protrusion or the dent in the rotating-shaft-section-side cover material.

4. A magnetic recording and reproduction apparatus according to claim 1, wherein the mode detection switch includes claws engaged with the circuit substrate to support the mode detection switch and a protrusion engaged with the circuit substrate to position the mode detection switch.

* * * * *